(12) United States Patent
Michels et al.

(10) Patent No.: US 8,745,843 B2
(45) Date of Patent: Jun. 10, 2014

(54) FORCE-TRANSMITTING ELEMENT, SLIDING SLEEVE, ARRANGEMENT AND METHOD FOR PRODUCING A NON-DETACHABLE WORKPIECE CONNECTION

(75) Inventors: Mathias Michels, Lennestadt (DE); Andreas Hütte, Attendorn (DE); Sudi Sinoplu, Attendorn (DE)

(73) Assignee: Viega GmbH & Co. KG, Attendorn (DE)

( * ) Notice: Subject to any disclaimer, the term of this patent is extended or adjusted under 35 U.S.C. 154(b) by 609 days.

(21) Appl. No.: 13/002,741

(22) PCT Filed: Jul. 7, 2009

(86) PCT No.: PCT/EP2009/058600
§ 371 (c)(1),
(2), (4) Date: Apr. 8, 2011

(87) PCT Pub. No.: WO2010/003951
PCT Pub. Date: Jan. 14, 2010

(65) Prior Publication Data
US 2011/0289761 A1    Dec. 1, 2011

(30) Foreign Application Priority Data

Jul. 7, 2008 (DE) .......................... 10 2008 031 554
Aug. 25, 2008 (DE) .......................... 10 2008 039 446

(51) Int. Cl.
*B23P 11/00* (2006.01)
*F16B 17/00* (2006.01)

(52) U.S. Cl.
USPC ........................................ 29/520; 403/374.1

(58) Field of Classification Search
USPC .............. 29/525.01, 520, 525, 428, 453, 237, 29/525.03; 403/374.1; 285/382, 255
See application file for complete search history.

(56) References Cited

U.S. PATENT DOCUMENTS

| 4,482,174 | A | 11/1984 | Puri |
| 4,598,938 | A | 7/1986 | Boss et al. |
| 5,470,113 | A | 11/1995 | Schwalm et al. |
| 6,450,553 | B1 | 9/2002 | Suresh |
| 8,262,138 | B2 * | 9/2012 | Rischen et al. ................ 285/255 |

FOREIGN PATENT DOCUMENTS

| CN | 1196783 A | 10/1998 |
| CN | 1551962 A | 12/2004 |
| CN | 2888233 Y | 4/2007 |
| DE | 195 12 986 C1 | 1/1997 |
| DE | 101 33 183 C1 | 11/2002 |
| DE | 202 80 179 U1 | 4/2004 |
| DE | 20 2004 000 031 U1 | 8/2004 |
| EP | 1288554 A1 | 3/2005 |
| WO | 85/00646 A1 | 2/1985 |
| WO | 2008/040941 A1 | 4/2008 |

* cited by examiner

*Primary Examiner* — John C Hong
(74) *Attorney, Agent, or Firm* — The Webb Law Firm

(57) ABSTRACT

A force-transmitting element for non-detachable workpiece connections includes a flange portion and a transmitting portion, wherein the transmitting portion has a substantially cylindrical inner peripheral surface and wherein the wall thickness of the transmitting portion tapers at least in sections from the end close to the flange portion to the end remote from the flange portion. An operationally reliable non-detachable workpiece connection can be obtained despite relatively small dimensions of the force-transmitting element. The end of the transmitting portion which is close to the flange portion has at least one latching depression on the outer peripheral surface.

17 Claims, 5 Drawing Sheets

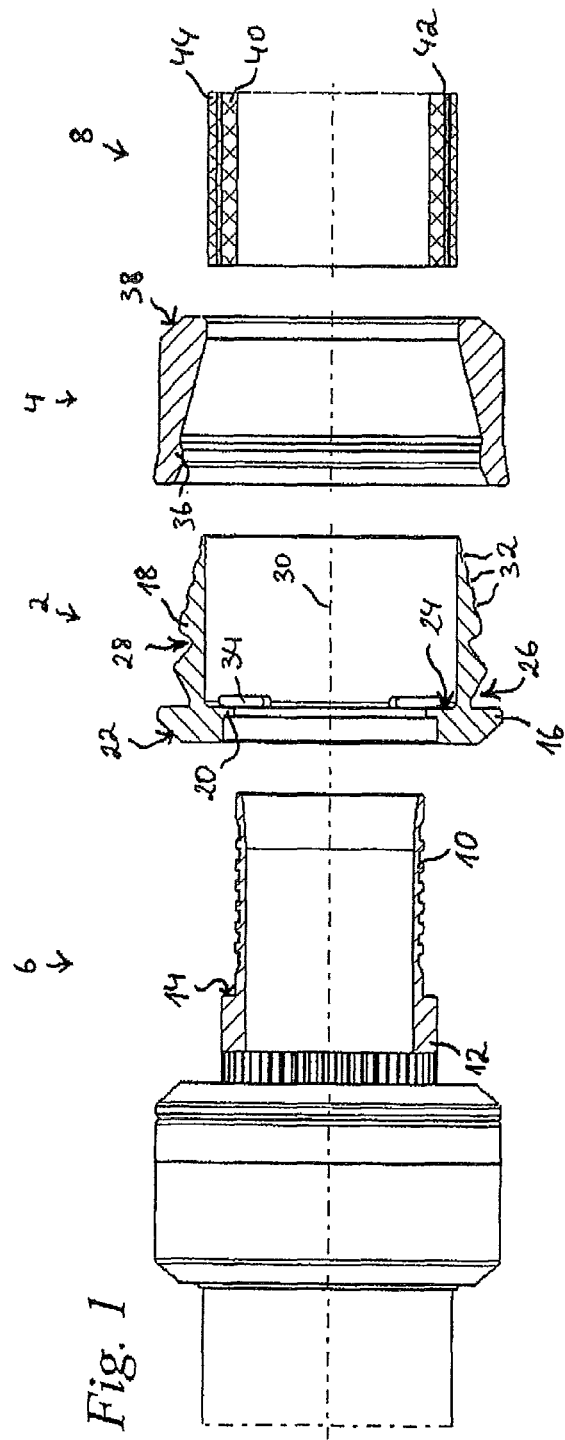
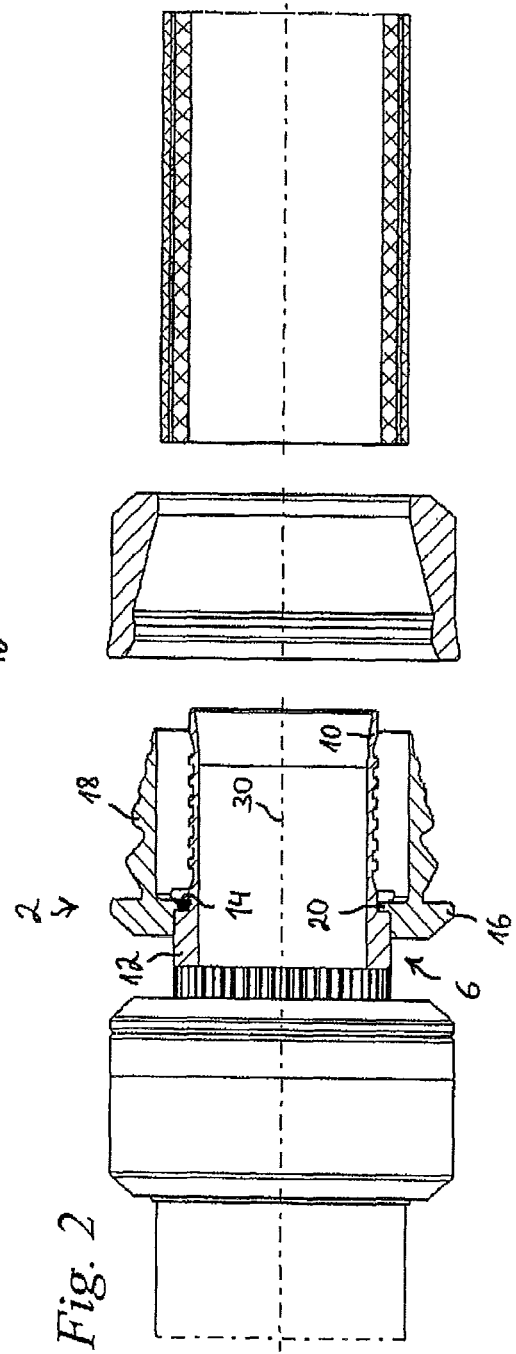
Fig. 1
Fig. 2

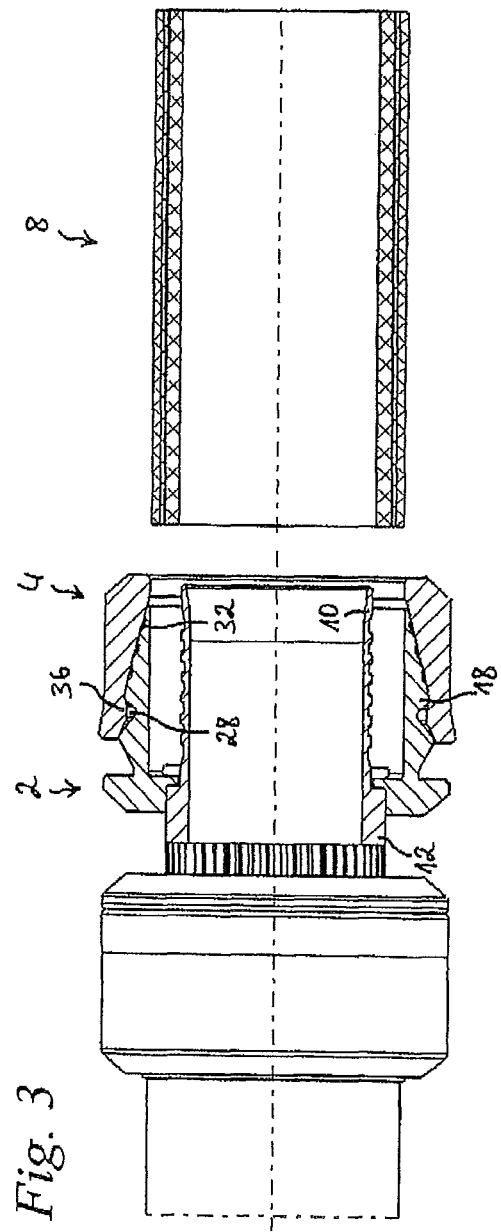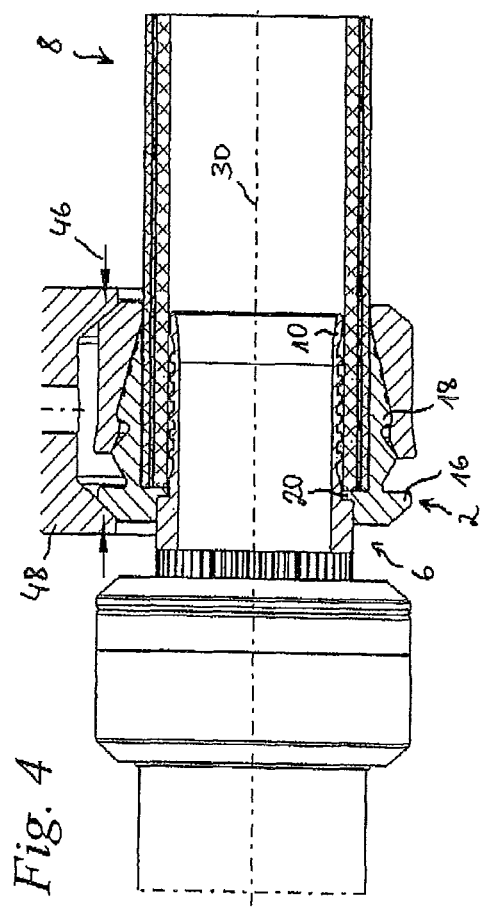

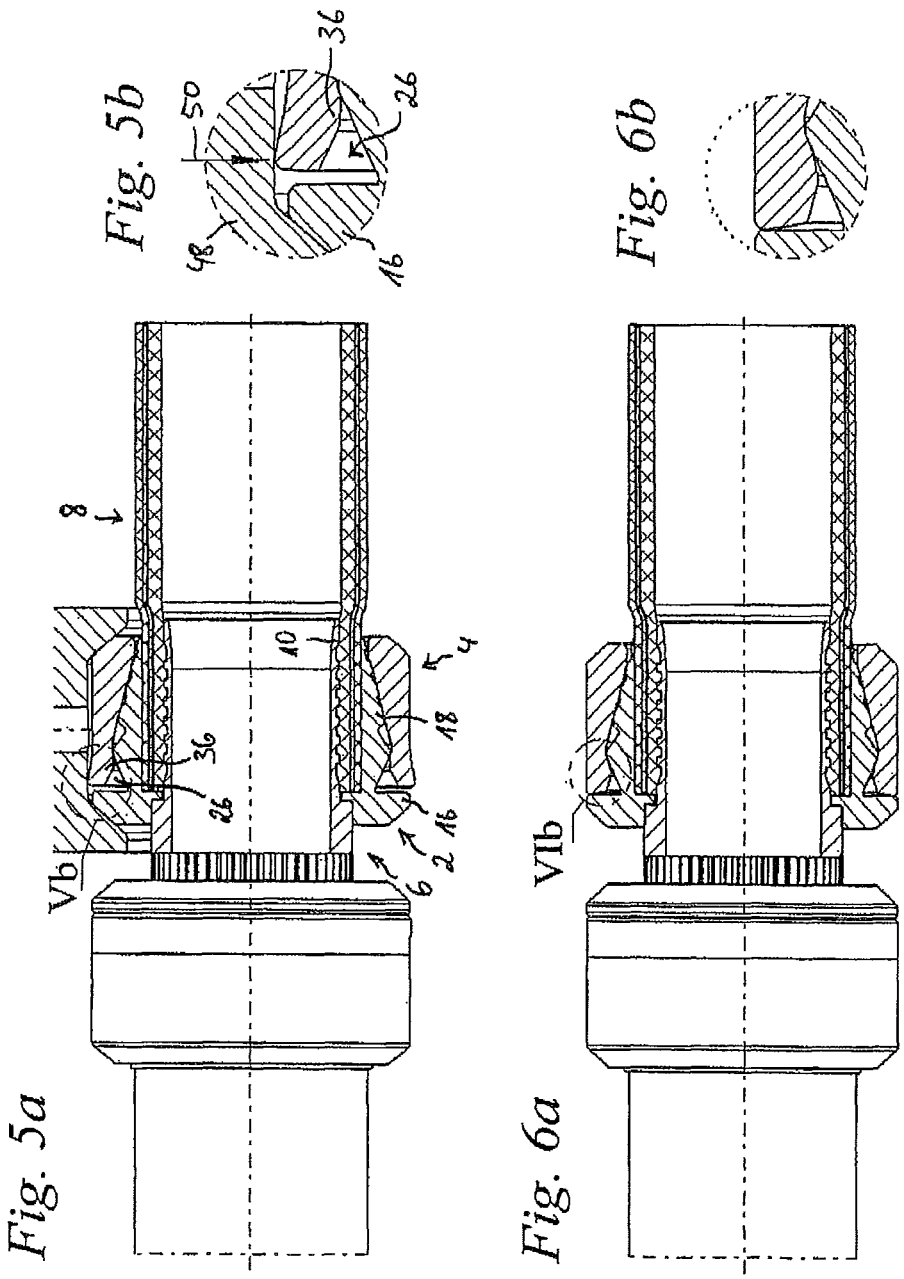

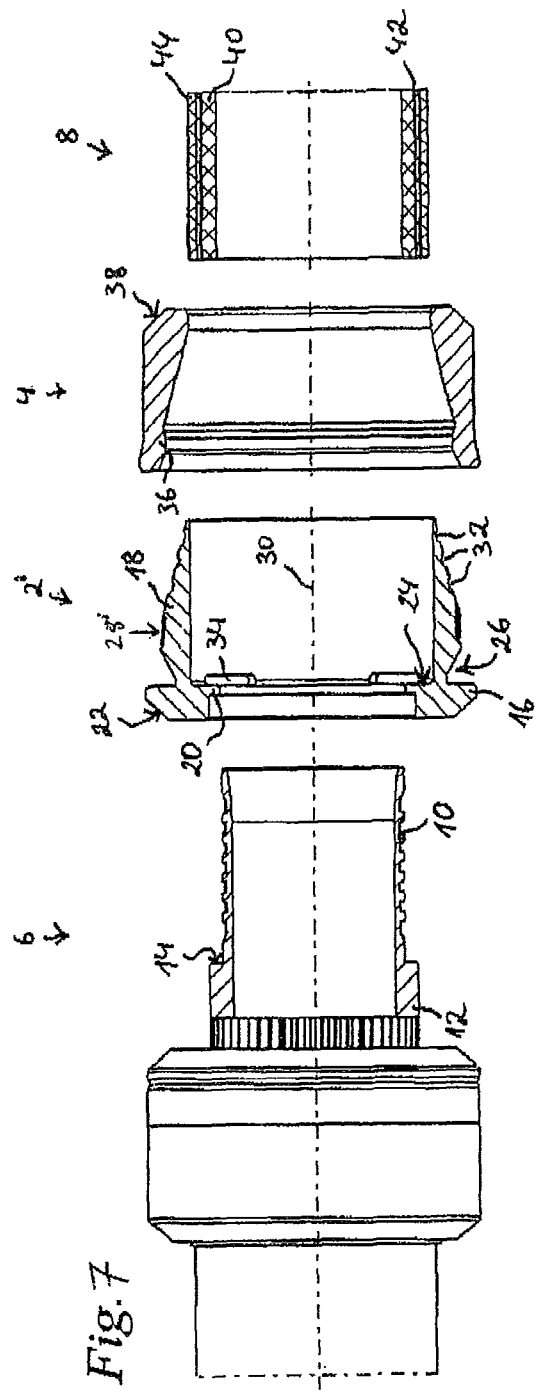

FORCE-TRANSMITTING ELEMENT, SLIDING SLEEVE, ARRANGEMENT AND METHOD FOR PRODUCING A NON-DETACHABLE WORKPIECE CONNECTION

BACKGROUND OF THE INVENTION

1. Field of the Invention

The invention relates to a force-transmitting element for non-detachable workpiece connections, having a flange portion and having a transmitting portion, wherein the transmitting portion has a substantially cylindrical inner peripheral surface and wherein the wall thickness of the transmitting portion tapers at least in sections from the end close to the flange portion to the end remote from the flange portion. The invention further relates to a sliding sleeve for non-detachable workpiece connections, having a first end, which has a certain section thickness, and a second end which, compared to the first end, has a tapered section, wherein the external diameter across the outer peripheral surface is constant at least in sections. The invention further relates to an arrangement comprising a fitting, a force-transmitting element and a sliding sleeve and a method for producing a non-detachable workpiece connection between a fitting, a pipe, a force-transmitting element and a sliding sleeve.

2. Description of Related Art

Patent specification EP 0 159 997 B1 discloses a method for producing a non-detachable workpiece connection between a fitting having a flange, a pipe, a force-transmitting element and a clamping ring, wherein the clamping ring is slid axially onto the force-transmitting element, which in turn encompasses the pipe and the fitting encompassed by the pipe, as far as the stop on the flange and thus brings about a shaping of the pipe within a profile provided for on the outer peripheral surface of the fitting. The angles of inclination of the surfaces, with which the force-transmitting element and the clamping ring interact during the pressing process, with reference to the central axis are small here, in order to be able to convert the greatest possible proportion of the axial dynamics into a radially inward pressing movement. The small angles of inclination, however, result in extensive axial movement of the clamping ring. As a result the pressing tools and the workpieces to be pressed such as for example the fitting, must have extensive dimensions. Admittedly it is basically possible to provide the interaction surfaces of the shaping ring and the force-transmitting element with greater angles of inclination to the central axis. But this causes the self-retaining forces between the force-transmitting element and the clamping ring after the pressing process to be reduced, so that these, in particular under the effect of temperature changes and the associated material expansion or contraction, loosen more easily and so the danger of the occurrence of leaks can increase.

The technical problem for the present invention is therefore to specify a force-transmitting element, a sliding sleeve, an arrangement and a method for producing a non-detachable workpiece connection, by means of which an operationally reliable non-detachable workpiece connection can be obtained despite smaller dimensions of the workpieces.

SUMMARY OF THE INVENTION

According to a first teaching of the present invention the technical problem is solved by a force-transmitting element in that the end of the transmitting portion which is close to the flange portion has at least one latching depression on the outer peripheral surface.

In this way it is possible to form an outer peripheral surface of the transmitting portion with a greater angle of inclination with respect to the central axis, so that a reduction of both the geometrical dimensions of the force-transmitting element and of the axial pressing path is achievable.

In one design of the force-transmitting element on the outer peripheral surface between the latching depression and the remote end of the transmitting portion at least one means for temporary fixing of a sliding sleeve is arranged. The means for temporary fixing of a sliding sleeve can for example be designed as a friction-fit, a substance to substance fit, for example as an adhesive, or as a form-fit, for example as a thread or depression. This design is advantageous for forming an outer peripheral surface of the transmitting portion with a further increased angle of inclination with respect to the central axis. For by providing a means for temporary fixing of a sliding sleeve and a latching depression on the transmitting portion along the axial extension of the transmitting portion at least two defined positions are created, at which a sliding sleeve, which is used for exerting the forces necessary for pressing, can be retained. With such a design—in a process for producing a non-detachable workpiece connection between a fitting, a pipe, the force-transmitting element according to the invention and the sliding sleeve—the sliding sleeve in a first step of the process, before the actual pressing takes place, is positioned on the force-transmitting element, wherein the means for temporary fixing of a sliding sleeve inhibits an axial movement of the sliding sleeve from the force-transmitting element downwards.

The latching depression arranged on the transmitting portion of the force-transmitting element for its part can be advantageously used to secure the sliding sleeve after axial pressing by means of a radial inward pressing process to the force-transmitting element, for example in that portions of the sliding sleeve are formed within the latching depression. In this way once the pressing processes have been completed, movements of the sliding sleeve from the force-transmitting element downwards are effectively inhibited, even if the material of the workpieces due to temperature variations experiences an expansion or contraction. The danger of leaks is correspondingly reduced. Thus a more stable and durable workpiece connection can be created, even if the angles of inclination are greater than is otherwise normal and both the external dimensions of the workpieces, in particular of the force-transmitting element, and the axial pressing paths are reduced.

The flange portion preferably offers a locating face for an abutting surface of the sliding sleeve before and/or after the pressing processes and accordingly limits the axial mobility of the sliding sleeve in at least one direction. The transmitting portion in turn allows the dynamics of the axially performed movement of the pressing tool to be converted at least partly into a radially inward movement and thus the application of the forces which are necessary in order to shape the pipe section encompassed by the force-transmitting element around a support body of a fitting or molding it into the possibly existing profile of the support body of the fitting, as a result of which the force- or form-fit workpiece connection between the workpieces, in particular the pipe and the fitting, is created.

The inner peripheral surface of the transmitting portion has a substantially cylindrical design. This is understood to mean that a pipe intended for a non-detachable workpiece connection from the transmitting portion side should be able to be introduced into the force-transmitting element, if necessary with a friction-fit. Since many pipes have a circular external section, a correspondingly adapted circular cylindrical design of the inner peripheral surface of the transmitting portion may be appropriate therefore. However, the force-transmitting element can also be designed for other external pipe sections, for example elliptical or prism-shaped sections. The term cylindrical should therefore be understood in a very wide sense. In particular, the substantially cylindrically-shaped inner peripheral surface can be modified by structural features, which alter the cylindrical nature of the surface, for example due to their small dimensions, only insignificantly.

Through the tapering at least in sections of the wall thickness of the transmitting portion, in an advantageous manner and outer peripheral surface is created which in the interaction with a suitable sliding sleeve used for the purposes of the pressing allows during the axial pressing process a more even exertion of force. In this way irregularities in the pressing result between the support body of a fitting and a pipe which can adversely affect the tightness of a non-detachable workpiece connection can be avoided. Measures in the form of additional sealing elements as in the state of the art are often arranged between the support body and the piper interior can likewise also be avoided in this way. Tapering in section means, in particular, that on the outer peripheral surface of the transmitting portion further form features can be arranged, for example further depressions between the means for temporary fixing of a sliding sleeve and the remote end of the transmitting portion, which while modifying the progression of the taper, and thus the reduction in wall thickness, retains the trend of this.

The latching depression can have a circular circumferential design, or a plurality of latching depressions can be arranged on a circular circumferential trajectory, in particular at regular intervals. Through the structural design of the latching depression as a circular circumferential depression, in relation to this feature in particular a rotationally symmetrical force-transmitting element can be provided which can integrate advantageously with other rotationally symmetrical workpieces, for example sliding sleeves. In addition the stability of a workpiece connection created can be guaranteed over the entire periphery of the workpieces. It is also possible, however, instead of a circular circumferential latching depression, to provide a plurality of individual latching depressions, for example in the form of spherical segments with corresponding hollow calotte surfaces, which if necessary are arranged in a circular line running around the transmitting portion. This can be advantageous from a production engineering point of view, if when the force transmitting element is produced only a small amount of material must be removed from the workpiece.

In a further design of the force-transmitting element on the outer peripheral surface between the latching depression and the remote end of the transmitting portion at least one retaining depression is arranged. This design of the means for temporary fixing of a sliding sleeve as a retaining depression is reliable and particularly simple to manufacture. In order to ensure a secure engagement of the sliding sleeve in the retaining depression, the sliding sleeve can have a corresponding mating component arranged on it, which in order to fix the sliding sleeve, engages with the retaining depression.

The retaining depression can have a circular circumferential design, or a number of retaining depressions can be arranged on a circular circumferential trajectory, in particular at regular intervals. For the retaining depressions the statements made above concerning the latching depressions apply in a similar manner.

In a further design of the force-transmitting element on the outer peripheral surface of the transmitting portion at least one depression can be provided to reduce the contact surface. Such depressions can for example be in the form of flutes or be designed as fluting. The resistance of the force-transmitting element and the sliding sleeve to an opposing axial pressing movement is essentially dependent upon the contact surface or the contact surfaces between the outer peripheral surface of the transmitting portion and the inner peripheral surface of the sliding sleeve. Through the depressions for reducing the contact surfaces this resistance is reduced, so that the slipping of the sliding sleeve onto the transmitting portion during the axial pressing movement and the axial pressing process itself are thereby simplified.

It is possible for the outer peripheral surface of the transmitting portion to at least in sections have a spherical segment-shaped design, wherein the angle of inclination relative to the central axis is in particular 15° to 75°, preferably 25° to 65°, especially 35° to 55°. By selecting a relatively high angle both the external dimensions of the force-transmitting element and the axial pressing path are reduced.

The outer peripheral surface of the transmitting portion can be designed at least in sections to promote sliding. In this way the pressing process can be made easier. The design of the outer peripheral surface to promote sliding can take a number of different forms. It is possible to design the corresponding portions of the transmitting portion to be two-part and to make the surfaces from a material such as polytetrafluorethylene or similar. It also possible, however, to increase the sliding capacity by providing the surfaces with a coating that promotes sliding, for example with a lubricant varnish coating.

It is possible for the flange portion on its inner peripheral surface to have a radially inward reaching contact element. This is particularly beneficial if the inner peripheral surface of the flange portion, in particular its shape or its diameter, is designed in a suitable manner for press-fitting with the base body of a fitting. In this way a friction-fit matching of the force-transmitting element to a fitting can be achieved, which if necessary is able to hold the force-transmitting element and the fitting together in an extensively fixed position even under the forces exerted during the pressing process.

According to a further teaching of the present invention the technical problem is also solved by a sliding sleeve in that on the inner peripheral surface of the tapered end at least one radially inwardly extending latching projection is arranged.

By means of the radially inwardly extending latching projection on the inner peripheral surface of the sliding sleeve, the sliding sleeve can be positioned stably on the force-transmitting element. For example, the latching projection engages with the retaining depression, if the sliding sleeve prior to the initiation of the pressing processes is pushed onto the transmitting portion of the force-transmitting element and thereby inhibits movement of the sliding sleeve from the force-transmitting element downwards. Alternatively the sliding sleeve in the vicinity of the latching projection can also be connected with the force-transmitting element with a friction-fit, a substance to substance fit, for example using adhesive, or another kind of a form-fit, for example by a thread on the latching projection and on the force-transmitting element. In this way in particular a more stable execution of the process can be guaranteed. The sliding sleeve preferably also comprises an elastic material, so that the tapered end of the sliding sleeve in the course of the axial pressing can easily expand elastically, until a provisional end position of the latching projection in relation to the latching depression of the force-transmitting element prior to initiation of the radially inward pressing process is reached. The external diameter, which is constant at least in sections, of the outer peripheral surface of the sliding sleeve can for example be modified by a slightly radial outward angling of the tapered end. In a design preferably adapted for the force-transmitting element according to the invention the sliding sleeve also contributes to the possibility of both the outer dimensions of the workpieces and the axial pressing paths being reduced.

In a design of the sliding sleeve according to the invention the tapered end is angled radially outwards, in particularly slightly, for example at an angle of 5° to 10°, in particular 6° to 8° to the central axis. With this design a radially inward pressing process following the axial pressing process can be made easier. For following the axial pressing process the angled end protrudes preferably slightly over the plane defined by the outer peripheral surface of the flange portion of the force-transmitting element and thereby offers a pressing tool for the radially inward pressing a more favourable starting point for the shaping of the portion of the sliding sleeve within the force-transmitting element promoting stability of the non-detachable workpiece connection.

Similarly to that stated above concerning the latching depression or the retaining depression, the latching projection can have a circular circumferential design, or a plurality of latching projections can be arranged in a circular circumferential trajectory, in particular at regular intervals.

On the inner peripheral surface of the sliding sleeve at least one depression can be provided to reduce the contact surface.

In a further advantageous design of the sliding sleeve the inner peripheral surface can be designed to be at least in sections conical segment-shaped, wherein the angle of inclination relative to the central axis is in particular 15°-75°, preferably 25°-65°, especially 35°-55°.

It is possible for the inner peripheral surface of the sliding sleeve to be designed at least in sections to promote sliding.

Regarding the further advantages of the designs of the sliding sleeve according to the invention, reference is made to the statements concerning the force-transmitting element according to the invention.

According to a further teaching of the present invention, the technical problem is also solved in that the end of the transmitting portion of the force-transmitting element near to the flange portion has at least one latching depression, that on the inner peripheral surface of the tapered end of the sliding sleeve at least one radially inward reaching latching projection is arranged and that the force-transmitting element encompasses the support body and at least in part the base body.

Through the arrangement according to the invention a system of workpieces can be created, which can be obtained by a user commercially. Thus the user merely has to ensure that the shape of the external section and/or the external diameter of the pipes to be pressed by him match the respective dimensions of the fitting, for example of the support body or of the force-transmitting element, for example the transmitting portion. This reduces the planning effort.

In an advantageous design of the arrangement, on the outer peripheral surface between the latching depression and the remote end of the transmitting portion at least one means for temporary fixing of a sliding sleeve is arranged, the sliding sleeve with the tapered end is pushed onto the transmitting portion far enough that the sliding sleeve comes into contact with the means for temporary fixing of a sliding sleeve and the sliding sleeve is temporarily fixed by the means for temporary fixing of a sliding sleeve. The temporary fixing of the sliding sleeve on the transmitting portion means that any movement of the sliding sleeve from the force-transmitting element downwards is prevented.

In a further advantageous design of the arrangement on the outer peripheral surface between the latching depression and the remote end of the transmitting portion at least one retaining depression is arranged and the sliding sleeve with the tapered end is pushed onto the transmitting portion far enough that the latching projection engages with the retaining depression. The design of the means for temporary fixing of a sliding sleeve as a retaining depression is reliable and particularly easy to produce.

In an advantageous design of the arrangement the inner peripheral surface of the sliding sleeve and the outer peripheral surface of the transmitting portion are preferably at least in part in friction-fit contact. In this way movement of the sliding sleeve from the defined intermediate position taken up prior to the pressing processes and of the transmitting portion of the force-transmitting element downwards can be counteracted. As a result of this the process reliability can be improved.

The flange portion can be fixed to the base body, wherein in particular a contact element of the flange portion comes into contact with the abutting surface of the base body turned in an axial direction. In particular a fixing in the form of a press fit can be used. In this way a friction-fit matching of the force-transmitting element to the fitting can be achieved, which if necessary is able to hold the force-transmitting element and the fitting together in an extensively fixed position even under the forces exerted during the pressing process.

It is particularly preferred if the inner peripheral surface of the sliding sleeve and the outer peripheral surface of the transmitting portion of the force-transmitting element are matched to one another. In this way a high level of compatibility between the sliding sleeves and the force-transmitting elements can be achieved.

Regarding further advantages of the arrangement according to the invention, reference is made to the statements made above concerning sliding sleeve according to the invention and the force-transmitting element according to the invention.

According to a further teaching of the present invention the technical problem is also solved by a method for manufacturing a non-detachable workpiece connection between a fitting, a pipe, a force-transmitting element and a sliding sleeve, in which the force-transmitting element with the sliding sleeve at least partly slid onto it is axially pressed, so that the pipe is shaped around a support body of the fitting, and in which the axial pressing process is followed by a radially inward pressing process, through which the sliding sleeve is at least in sections shaped within the force-transmitting element, so that an axial movement of the sliding sleeve relative to the force-transmitting element after the pressing processes is inhibited.

Through the radially inward pressing process a shorter pressing path in particular can be achieved. This advantageously reduces the requirements on the size of the installation space which must be provided for the production of the non-detachable workpiece connection. With the method according to the invention it is thus possible to develop interaction surfaces of the workpieces, for example the outer peripheral surface of the transmitting portion of the force-transmitting element or the inner peripheral surface of the sliding sleeve with virtually any angle of inclination to the central axis, wherein in particular comparatively high angles of inclination are preferred which allow the external geometrical dimensions, in particular of the force-transmitting element and of the sliding sleeve to be selected to be less extensive. Despite this modification these workpieces can be used in order to create stably and durably tight non-detachable workpiece connection.

In an advantageous embodiment of the method a fitting having a support body with a profile and a base body can be used wherein the pipe is molded into the profile of the support body. Through the provision of a profile in particular the resistance and stability of a force- or also form-fit workpiece connection of the pipe with the support body of the fitting can be promoted. The seal characteristics can also for example benefit further from the labyrinth seal brought about by the profile.

A force-transmitting element can be used which has a flange portion and a transmitting portion, wherein the end of the transmitting portion near to the flange portion on the outer peripheral surface has at least one latching depression and wherein the sliding sleeve at least in sections is shaped within the latching depression. In this way it can be extensively avoided that during the radially inward pressing process and thus also the deformation process material of the transmitting portion of the force-transmitting element is displaced or compressed. The method can accordingly be carried out more simply. In particular the forces necessary for pressing can be reduced.

In a further advantageous embodiment of the method a sliding sleeve is used having a first end with a section of a certain thickness and a second which, compared with the first end, has a tapered portion, wherein at least one radially inward reaching latching projection is arranged. By means of such a design of the sliding sleeve the positioning of the sliding sleeve in the force-transmitting element is simplified.

In a further advantageous embodiment of the method a force-transmitting element, having on the outer peripheral surface between the latching depression and the remote end of the transmitting portion at least one means for temporary fixing of a sliding sleeve, and a sliding sleeve, having a first end with a section of a certain thickness and a second end, which compared with the first end, has a tapered portion, wherein on the inner peripheral surface of the tapered end at least one radially inward reaching latching projection is arranged, can be used, wherein the sliding sleeve with its tapered end is slid onto the transmitting portion, until it comes into contact with the means for temporary fixing of a sliding sleeve and the sliding sleeve is temporarily fixed by the means for temporary fixing of a sliding sleeve. Through the engaging of the latching projection in the retaining depression—before the actual pressing process takes place—in particular a stable intermediate position is created, in which the individual workpieces are positioned relatively securely with one another. The installer can thus, without needing to be concerned about a shift in the positions, be given the opportunity to check the alignments of the workpieces to be pressed before the pressing process is initiated.

It is possible to use a sliding sleeve for the method whose tapered end is angled radially outwards, and whose angled end during the radially inward pressing process is formed with the outer peripheral surface of the flange portion in an extensively aligned orientation. In this way ultimately a compact non-detachable workpiece connection can be achieved which takes up little room.

Furthermore, the force-transmitting element and the sliding sleeve slid onto this can be axially pressed, wherein the latching projection is brought into a position opposite the latching depression.

The axial pressing process can be followed by a radially inward pressing process, in which the latching projection is brought into engagement with the latching depression. In this way axial movements of the sliding sleeve relative to the force-transmitting element can be prevented.

The method can be carried out in such a way that initially the force-transmitting element, then the sliding sleeve and finally the pipe are positioned on the fitting.

It is likewise possible, however, to first position the force-transmitting element and the sliding sleeve on the pipe before this intermediate arrangement is pushed onto the fitting. Thus the method can be performed in different ways.

In a further advantageous embodiment of the method, the force-transmitting element on the outer peripheral surface between the latching depression and the remote end of the transmitting portion has at least one retaining depression and the sliding sleeve with its tapered end is pushed onto the transmitting portion until the latching projection engages in an intermediate position in the retaining device. The design of the means for temporary fixing of a sliding sleeve as a retaining depression is reliable and particularly simple to manufacture.

Regarding the further advantages or features of the method according to the invention, reference is made to the above statements concerning products according to the invention.

BRIEF DESCRIPTION OF THE DRAWINGS

There is a now a plurality of possibilities for designing and further developing the force-transmitting element according to the invention, the sliding sleeve according to the invention, the arrangement according to the invention and the method according to the invention for producing a non-detachable workpiece connection. On this point reference is made firstly to the dependent claims subordinate to the independent claims and secondly to the description of an exemplary embodiment in conjunction with the drawing. The drawing shows as follows:

FIG. 1 a cross-sectional view of a fitting, a pipe and exemplary embodiments of a force-transmitting element and a sliding sleeve according to the present invention;

FIG. 2 a cross-sectional view of the fitting, the pipe and the exemplary embodiments of the force-transmitting element and the sliding sleeve according to the present invention, wherein the force-transmitting element is positioned on the fitting;

FIG. 3 a cross-sectional view of the arrangement according to the present invention and the pipe, wherein the sliding sleeve is positioned on the force-transmitting element in an intermediate position;

FIG. 4 a cross-sectional view of the fitting, the pipe and the exemplary embodiments of the force-transmitting element and the sliding sleeve according to the present invention, wherein the pipe is introduced between the fitting and the force-transmitting element and whereby initially an axial pressing is carried out;

FIGS. 5a-b a cross-sectional view of the fitting, the pipe and the exemplary embodiments of the force-transmitting element and the sliding sleeve according to the present invention, before, following the execution of the axial pressing, a radially inward pressing process is performed;

FIGS. 6a-b a cross-sectional view of the fitting, the pipe and the exemplary embodiments of the force-transmitting element and the sliding sleeve according to the present invention following completion of the radially inward pressing process;

FIG. 7 a cross-sectional view of a fitting, a pipe and further exemplary embodiments of a force-transmitting element and a sliding sleeve according to the present invention;

FIG. 8 a cross-sectional view of a further exemplary embodiment of an arrangement according to the present invention and the pipe, wherein the sliding sleeve is positioned on the force-transmitting element in an intermediate position, and FIG. 9 further examples of variants of the workpieces.

DETAILED DESCRIPTION OF THE INVENTION

Figure 9:
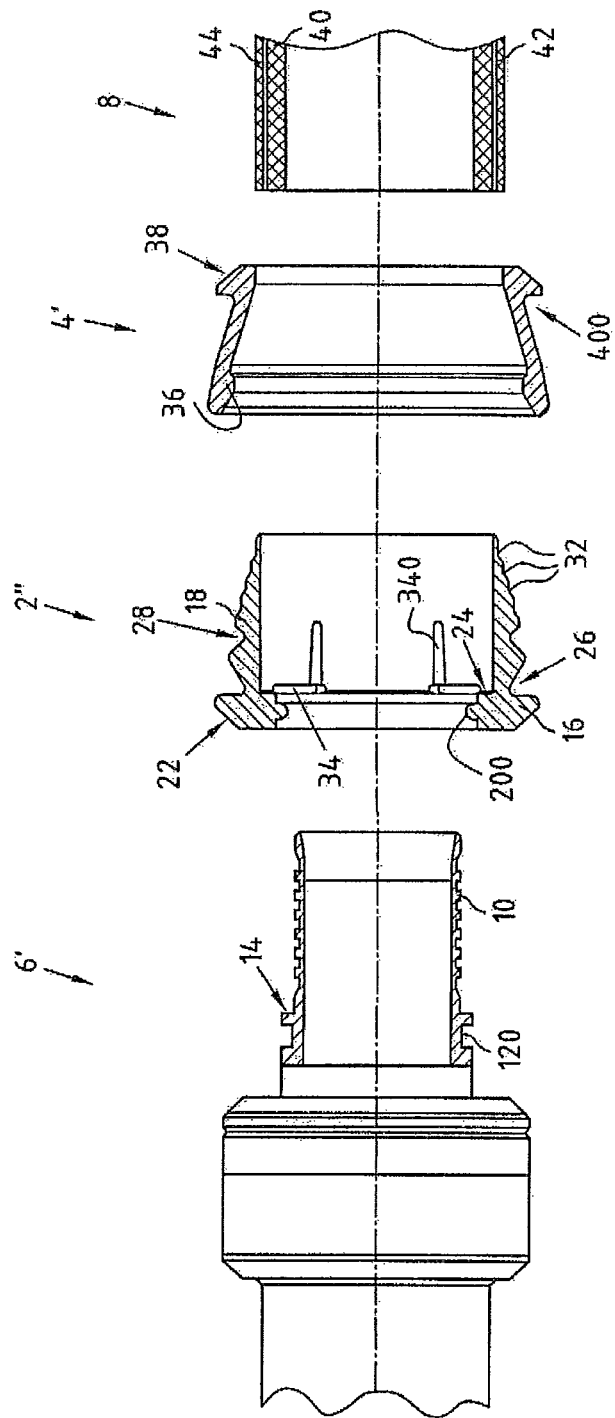

In the following, by reference to FIGS. 1 to 6*b*, by way of example a method for producing a non-detachable workpiece connection according to the present invention is explained, in which an exemplary embodiment of the force-transmitting element 2 according to the invention and of the sliding sleeve 4 according to the invention are used.

FIG. 1 provides a cross-sectional view of four workpieces: a fitting 6, a force-transmitting element 2, a sliding sleeve 4, and a pipe 8.

The fitting 6 has a support body 10 having a profile. The support body 10 extends in this example from a base body 12. The fitting 6 also has on the point of transition from the base body 12 to the support body 10 an abutting surface 14 turned in an axial direction. The profile in this particular example consists of seven circular circumferential grooves, which are delimited from each other by six circular circumferential separating webs arranged in between them. The inner peripheral surface of the support body 10 has a substantially cylindrical shape, wherein however the support body wall at the end of the support body 10 remote from the base body 12 is slightly radially tapered outwards, in order to create a continuous sectional transition.

Arranged in front of the fitting 6 in FIG. 1 is a force-transmitting element 2 according to the present invention. The force-transmitting element 2 has in this particular example a flange portion 16 turned towards the fitting 6 and a transmitting portion 18. On the inner peripheral surface the flange portion 16 has in this exemplary embodiment a radially inward reaching contact element 20. In the exemplary embodiment of the force-transmitting element 2 shown in FIG. 1 on the outer peripheral surface of the flange portion 16 on the end face a chamfer 22 is also arranged, which can serve as a an interaction surface with a pressing tool (not shown). The flange portion 16 on its radially inward reaching area also has an abutment surface 24 turned in an axial direction with which an end face of a pipe 8 can come into contact. The inner peripheral surface of the flange portion 16 can be in the form of a polygon (not shown). In this way in the interaction with the outer peripheral surface of the fitting base body 12, on which the force-transmitting element 2 is to be positioned, opposite the inner peripheral surface of the flange portion 16, additional security against undesired rotational movements of the force-transmitting element 2 relative to the fitting 6 can be achieved.

The transmitting portion 18 of the force-transmitting element 2 has a wall thickness that tapers at least in sections from the end near to the flange portion 16 as far as the end remote from the flange section 16. This is understood to mean that the taper, that is to say the reduction in wall thickness, while being modified by form elements such as a latching depression 26, which in this example is arranged on the end of the transmitting portion 18 near to the flange portion 16, and which is circular and circumferential, and a retaining depression 28, which in this example is circular and circumferential and is arranged between the latching depression 26 and the end remote from the flange portion 16, nevertheless retains its progression. The taper or decrease in wall thickness can this be represented by an imaginary line (not shown), running through the portions of the transmitting portion 18 positioned at the outward radial extreme, for example in the manner of an envelope. In this particular exemplary embodiment the reduction in wall thickness takes place at least in sections through the formation of a conical segment surface, which is inclined at an angle of approximately 15° to the central axis 30 of the force-transmitting element 2. It is also possible, however, to select an angle of up to 75°.

On the outer peripheral surface of the transmitting portion 18 in this example between the retaining depression 28 and the remote end three depressions 32 for reducing the contact surface are arranged. The depressions 32 take the form in this example of circular circumferential flutes, but can also have the form of fluting.

In the area of the end of the transmitting portion 18 of the force-transmitting element 2 near to the flange portion 16, in this example two openings 34 are arranged extending substantially in the circumferential direction. The openings 34 allow an installer to visually check the position of the workpieces 2, 4, 6, 8 prior to and if necessary after the pressing process. The openings 34 can of course also have a different form or be arranged at a different place. The number of openings 34 can also basically be freely selected.

To prevent rotation a design of the inner peripheral surface of the transmitting portion 18 as a polygon (not shown) can be provided.

FIG. 1 also shows a sliding sleeve 4, the first end of which in cross-section, thus in the cross-sectional view, has a certain thickness, and the second end of which compared with the first end in cross-section is tapered. The external diameter of the sliding sleeve 4 is constant at least in sections across the outer peripheral surface in the axial direction. This means in particular that form features with low spatial dimensions can be provided, which modify the constancy of the external diameter. In this particular example a modification takes place in that the tapered end of the sliding sleeve 4 is slightly angled radially outwards. It is also possible, however, to fashion the sliding sleeve 4 with an external diameter that is constant over the entire axial extension of the sliding sleeve 4. Furthermore, on the inner peripheral surface of the tapered end a radially inward reaching latching projection 36 is arranged, which in this example is circular and circumferential. The inner peripheral surface of the sliding sleeve 4 has at least in sections hollow calotte segments. On the outer peripheral surface of the sliding sleeve 4 on the end that is not tapered a chamfer 38 is arranged, on which a pressing tool (not shown) can be applied.

The final workpiece in the set-up shown in FIG. 1 is in this exemplary embodiment a composite pipe 8, comprising three layers 40, 42, 44. By way of example the inner layer 40 can consist of a cross-linked polyethylene (POX), the middle layer 42 of a metal such as aluminium and the outer layer 44 of a plastic that is resistant in particular to mechanical stresses or is also satisfactory from the aesthetic point of view. The composite pipe 8 shown in FIG. 1 should only be understood to be an example. The set-up shown in FIG. 1 can of course also involve a single-layer pipe, for example in a plastic or metal or metallic material. The cross-section of the pipe 8 is also basically not restricted. What is important is that the relevant diameters of the workpieces 2, 4, 6, 8, and thus the external diameter of the support body 10 of the fitting 6 and the internal diameter of the pipe 8 and accordingly the external diameter of the pipe 8 and the internal diameter of the transmitting portion 18 of the force-transmitting element 2 are compatible with or matched to each other.

The set-up shown in FIG. 2 differs from that shown in FIG. 1 in that the force-transmitting element 2 is placed on the fitting 6 or the fitting 6 engages in the force-transmitting element 2. The flange portion 16 is in this example fixed by means of a press-fit, thus a fiction-fit to the fitting base body 12 thereby inhibiting an axial movement of the force-transmitting element 2 and of the fitting 6 in relation to one another. The abutment surface 14 turned in an axial direction of the fitting 6 is in contact in this example with the contact element 20 arranged on the flange portion 16. In the exemplary embodiment shown in FIG. 2 the fitting base body 12 is substantially encompassed by the flange portion 16 and the support body 10 substantially by the transmitting portion 18, wherein the remote end of the support body 10 on the transmitting portion side protrudes from the force-transmitting element 2. This design is not obligatory, however. It is just as conceivable for the remote end of the support body 10 and the remote end of the transmitting portion 18 to be located approximately in the same perpendicular plane to the central axis 30, or for the remote end of the transmitting portion 18 to even protrude the support body 10. Various designs can thus be selected.

The arrangement according to the invention shown in FIG. 3 differs from the one shown in FIG. 2 in that the sliding sleeve 4 on the transmitting portion side is pushed on to the force-transmitting element 2. The latching projection 36 arranged at the tapered end of the sliding sleeve 4 engages in the retaining depression 28 arranged on the outer peripheral surface 18, so that in an intermediate position—before the actual pressing processes are initiated—a movement of the sliding sleeve 4 from the force-transmitting element 2 downwards is inhibited. The other portions of the inner peripheral surface of the sliding sleeve 4 and the portion of the transmitting portion 18 positioned between the retaining depression 28 and the remote end are preferably matched to each other and are at least in sections—apart from the depressions 32 to reduce the contact surface—in friction-fit contact.

FIG. 3 thus shows an arrangement according to the invention for producing a non-detachable workpiece connection, as can be obtained by an installer commercially, and which only has to have a pipe 8 to be pressed added in order to be able to perform the pressing.

FIG. 4 shows the set-up known from FIGS. 1 to 3, in which the pipe 8 is introduced into the hollow space between the support body 10 of the fitting 6 and the transmitting portion 18 of the force-transmitting element 2. The end face of the pipe 8 is pushed on as far as the stop on the flange portion 16 or the contact element 20 arranged in the flange portion 16. By means of the openings 34 (cannot be seen) arranged on the transmitting portion 18 the installer in the set-up shown in FIG. 4 can check that the workpieces 2, 4, 6, 8 are correctly positioned in relation to one another.

In order to initiate the production of the non-detachable workpiece connection, now in the direction of the arrow 46 shown in FIG. 4, parallel to the central axis 30, for example by using a pressing tool 48 (shown unilaterally here), the axial pressing forces can be exerted.

The result of the axial pressing process is shown in FIG. 5a. Through the exertion of the pressing forces the sliding sleeve 4 is moved over the transmitting portion 18 in the axial direction towards the flange portion 16. Through the inclination of the portion of the inner peripheral surface of the sliding sleeve 4 and the corresponding portions of the outer peripheral surface of the transmitting portion 18 the dynamics of the pressing movement exerted in the axial direction in this particular exemplary embodiment are at least partially deflected into radially inward acting pressing forces. The transmitting portion 18 transmits the pressing forces onto the pipe 8, which is deformed radially inward in such a way that the grooves separated by the separating webs on the support body 10 of the fitting 6 take up the displaced material of the pipe 8, and thus a friction- or form-fit can result, which guarantees the tightness of the non-detachable workpiece connection. In the provisional end position after the axial pressing process the latching projection 36 of the sliding sleeve 4 is positioned opposite the latching depression 26 of the transmitting portion 18, wherein however a portion of the latching projection 36 can be in contact with a wall of the latching depression 26 in such a way that an axial movement of the sliding sleeve 4 after the axial pressing process from the force-transmitting element 2 downwards is inhibited.

As shown in the enlargement in FIG. 5b the tapered end of the sliding sleeve 4 following the axial pressing process protrudes slightly over the plane defined by the outer peripheral surface of the flange portion 16 slightly radially outwards and thus offers a pressing tool 48 a favourable starting point for a radially inward pressing movement (arrow 50). In this way the axial pressing process is followed by a radially inward pressing process, as a result of which a portion of the sliding sleeve 4, in this example the tapered end of the sliding sleeve 4, on the inner peripheral surface of which the latching projection 36 is arranged, is shaped within the latching depression 26 and thus a stable latching of the sliding sleeve 4 with the force-transmitting element 2 is brought about. In this way a situation can be counteracted in which the sliding sleeve 4 comes loose from the force-transmitting element 2, for example because of material expansions or contractions triggered by temperature changes, which could lead to leaks.

FIG. 6a again shows the four workpieces 2, 4, 6, 8, after both the axial and the radial inward pressing processes have been completed and the non-detachable workpiece connection has thus been produced. As can be seen from the enlargement in FIG. 6b, the angled end of the sliding sleeve 4 during the radially inward pressing process is formed in an extensively aligned orientation with the outer peripheral surface of the flange portion 16. In this way the non-detachable workpiece connection can have a very compact design.

FIG. 7 shows in cross-section four workpieces: a fitting 6, a force-transmitting element 2', a sliding sleeve 4 and a pipe 8. The parts corresponding to the parts from FIG. 1 are identified by the same reference numbers. The force-transmitting element 2' has a means 28' for temporary fixing of a sliding sleeve. The means 28' can for example be designed as a surface suitable for a friction-fit with the sliding sleeve 4, as an adhesive surface, as a thread or as a depression suitable for a form- and/or friction-fit. In the case of a thread the sliding sleeve in the area of the latching projection 36 can also be designed with a corresponding counter-thread.

FIG. 8 shows an arrangement according to the invention for producing a non-detachable workpiece connection from the components shown in FIG. 7, as may be obtained by an installer commercially, and which only has to have a pipe 8 added, in order to be able to carry out the pressing.

The force-transmitting element 2' shown in FIGS. 7 and 8 can alternatively also have no means 28' for temporary fixing of a sliding sleeve.

FIG. 9 shows exemplary embodiments of further variants of the workpieces. The fitting 6' has in this variant a base body 12, with a circular circumferential latching groove 120. The latching groove 120 can interact with a circular, circumferential, radial inward latching nose 200 arranged on the flange portion 16 of the force-transmitting element 2" in the manner of a snap connection, so that the fitting 6' and the force-transmitting element 2" in the present example can be secured to each other in a non-detachable manner.

The force-transmitting element 2" has in addition in its force-transmitting portion 18 depressions 340 running in the axial direction. These depressions 340 make the pressing of the force-transmitting element 2"easier, because additional room is available into which the material of the force-transmitting portion 18 can flow during pressing. Stresses from material compression (or material densification) can thus be moderated.

The sliding sleeve 4' shown in FIG. 9 by way of example has on its outer peripheral surface a material depression 400. By means of the material depression 400 the weight of the sliding sleeve 4' can be reduced lowering the production costs of this and simplifying its use.

The invention claimed is:

1. An arrangement for producing a non-detachable workpiece connection, comprising:
   a fitting having a support body having a profile and a base body,
   a force-transmitting element having a flange portion and a transmitting portion with a substantially cylindrical inner peripheral surface, wherein a wall thickness of the transmitting portion tapers at least in sections from an end close to the flange portion to an end remote from the flange portion, and
   a sliding sleeve having a first end with a certain section thickness, and a second end which, compared to the first end, has a tapered section, wherein an external diameter across an outer peripheral surface in an axial direction is constant at least in sections,
   wherein the end of the transmitting portion of the force-transmitting element near to the flange portion on the outer peripheral surface has at least one latching depression,
   wherein at least one radially inward reaching latching projection is arranged on an inner peripheral surface of the tapered end of the sliding sleeve, and
   wherein the force-transmitting element encompasses the support body and at least in part the base body.

2. The arrangement according to claim 1, further comprising at least one means for temporary fixing of a sliding sleeve arranged on an outer peripheral surface between the latching depression and the remote end of the transmitting portion, wherein the second end of the sliding sleeve is pushed onto the transmitting portion far enough that the sliding sleeve comes into contact with a means for temporary fixing of the sliding sleeve and wherein the sliding sleeve is temporarily fixed on the transmitting portion by the means for temporary fixing of the sliding sleeve.

3. The arrangement according to claim 2, further comprising at least one retaining depression arranged on an outer peripheral surface between the latching depression and the remote end of the transmitting portion wherein the second end of the sliding sleeve is pushed onto the transmitting portion far enough that the latching projection engages in a retaining depression.

4. The arrangement according to claim 3, wherein the retaining depression has a circular circumferential design such that a plurality of retaining depressions are arranged on a circular circumferential trajectory at regular intervals.

5. The arrangement according to claim 1, wherein the flange portion is fixed to the base body, and wherein a contact element of the flange portion contacts with an abutment surface of the base body turned in an axial direction.

6. The arrangement according to claim 1, wherein the latching depression has a circular circumferential design, such that a plurality of latching depressions are arranged on a circular circumferential trajectory at regular intervals.

7. The arrangement according to claim 1, wherein the tapered end of the sliding sleeve is angled radially outwards.

8. The arrangement according to claim 1, wherein the latching projection has a circular circumferential design such that a plurality of latching projections are arranged on a circular circumferential trajectory at regular intervals.

9. A method for producing a non-detachable workpiece connection between a fitting, a pipe, a force-transmitting element, and a sliding sleeve, comprising the steps of:
   an axial pressing step in which the force-transmitting element with the sliding sleeve pushed onto the force-transmitting element at least in part is axially pressed so that the pipe is molded onto a support body of the fitting, and
   a radially inward pressing step in which the sliding sleeve is at least in sections molded into the force-transmitting element, so that an axial movement of the sliding sleeve relative to the force-transmitting element is inhibited.

10. The method according to claim 9, wherein the fitting has a base body and a support body having a profile and wherein the pipe is shaped within the profile of the support body.

11. The method according to claim 9, wherein the force-transmitting element has a flange portion and a transmitting portion, wherein an end of the transmitting portion near to the flange portion on an outer peripheral surface has at least one latching depression and wherein the sliding sleeve is at least in sections molded into the latching depression.

12. The method according to claim 9, wherein the sliding sleeve has a first end with a section of a certain thickness and a second end with a tapered section compared with the first end, wherein at least one radially inward reaching latching projection is arranged on an inner peripheral surface of the tapered end.

13. The method according to claim 9, wherein the force-transmitting element on an outer peripheral surface between the latching depression and a remote end of the transmitting portion has at least one means for temporary fixing of the sliding sleeve, wherein the second end of the sliding sleeve is pushed onto the transmitting portion until the sliding sleeve comes into contact with the means for temporary fixing of the sliding sleeve, and wherein the sliding sleeve is temporarily fixed by the means for temporary fixing of the sliding sleeve.

14. The method according to claim 9, wherein the force-transmitting element on an outer peripheral surface between the latching depression and a remote end of the transmitting portion has at least one retaining depression, and wherein the second end of the sliding sleeve is pushed onto the transmitting portion until the latching projection engages in an intermediate position in the retaining depression.

15. The method according to claim 9, wherein the second end of the sliding sleeve is angled radially outwards, and wherein the angled end during the radially inward pressing process is shaped with an outer peripheral surface of the flange portion in an extensively aligned orientation.

16. The method according to claim 9, wherein the force-transmitting element and the sliding sleeve pushed onto the force-transmitting element are axially pressed, and wherein a latching projection is brought into a position opposite a latching depression.

17. The method according to claim 9, wherein a latching projection is brought into engagement with a latching depression.

* * * * *